US012728451B2

(12) United States Patent
Sun

(10) Patent No.: US 12,728,451 B2
(45) Date of Patent: Sep. 8, 2026

(54) COFFEE CAPSULE RECYCLING PRESS

(71) Applicant: City Linker International Limited, Hong Kong (CN)

(72) Inventor: Lung Cheung Lionel Sun, Kowloon (CN)

(73) Assignee: City Linker International Limited, Hong Kong (CN)

( * ) Notice: Subject to any disclaimer, the term of this patent is extended or adjusted under 35 U.S.C. 154(b) by 205 days.

(21) Appl. No.: 18/835,856

(22) PCT Filed: Feb. 7, 2023

(86) PCT No.: PCT/EP2023/053006
§ 371 (c)(1),
(2) Date: Aug. 5, 2024

(87) PCT Pub. No.: WO2023/148406
PCT Pub. Date: Aug. 10, 2023

(65) Prior Publication Data

US 2025/0135514 A1 May 1, 2025

(30) Foreign Application Priority Data

Feb. 7, 2022 (GB) ..................................... 2201548

(51) Int. Cl.
*B09B 3/32* (2022.01)
*B30B 1/04* (2006.01)
*B09B 101/70* (2022.01)

(52) U.S. Cl.
CPC .................. *B09B 3/32* (2022.01); *B30B 1/04* (2013.01); *B09B 2101/70* (2022.01)

(58) Field of Classification Search
CPC ......... B09B 3/32; B09B 2101/70; B09B 3/80; B30B 1/04; B30B 9/321; A47J 31/44; B65B 69/0058
See application file for complete search history.

(56) References Cited

U.S. PATENT DOCUMENTS 8,479,638 B2 * 7/2013 Leung .................... A47J 31/44
99/302 R
9,586,709 B1 * 3/2017 Rivera ..................... B65B 7/28
(Continued)

FOREIGN PATENT DOCUMENTS

EP 3804579 A1 4/2020
IT MI20100490 3/2010

OTHER PUBLICATIONS

European Patent Office; International Search Report; May 3, 2023; entire document.

*Primary Examiner* — Khaled Annis
(74) *Attorney, Agent, or Firm* — Price Heneveld LLP

(57) ABSTRACT

A beverage capsule recycling press includes an annular body having an axis, an axial inlet, an axial outlet and a radially symmetrical annular sleeve communicating between the inlet and outlet, the body comprising first and second body portions connected by a hinge extending parallel to the axis, the second body portion being pivotable about the hinge relative to the first body portion between closed and open positions, a piston having a piston head and connected to the first body portion and moveable between a retracted position in which the piston is withdrawn from the inlet and an extended position in which the piston passes through the inlet and is located in the sleeve, and a piston mounting for moving the piston between the retracted and extended positions, wherein first and second channels extend circumferentially of the first and second body portions respectively adjacent the outlet.

18 Claims, 5 Drawing Sheets

(56) References Cited

U.S. PATENT DOCUMENTS

| | | | | |
|---|---|---|---|---|
| 11,006,777 | B1 * | 5/2021 | Weber | A47J 31/5251 |
| 11,840,397 | B2 * | 12/2023 | Rivera | B65B 67/02 |
| 2010/0050880 | A1 | 3/2010 | Suter et al. | |
| 2011/0162533 | A1 * | 7/2011 | Fumagalli | A47J 31/3695<br>99/295 |
| 2012/0228417 | A1 * | 9/2012 | Connelly | A47J 19/04<br>241/201 |
| 2023/0172387 | A1 * | 6/2023 | Hsieh | B26B 27/00 |
| 2024/0349935 | A1 * | 10/2024 | Tseng | A47J 31/525 |
| 2025/0135514 | A1 * | 5/2025 | Sun | B30B 1/04 |

* cited by examiner 8
7
16
19
18
2
14
1
11
4
10
9
3
12
15

1
2
3
4
5
6
7
8
10
11
13
14
15
16
22
23
26
27
28
29
30
31
I
J
2.7

30
31
29
D
7
1
D
F
F
14
22
13
8

COFFEE CAPSULE RECYCLING PRESS

BACKGROUND

This invention relates to a press tool for recycling capsules of beverages, particularly but not exclusively coffee for use in coffee dispensing machines.

Capsules for coffee dispensers comprise a cup shaped body usually composed of aluminium, having a mouth formed by an annular rim closed by a sheet of metallic foil, a portion of coffee or other beverage being encapsulated within the body. In use, the capsule is inserted into a coffee dispenser which perforates the capsule and foil sheet to permit boiling water or steam to pass through the body to create and dispense a portion of the coffee. The capsule body is composed of a thicker and stronger metal than the thinner foil sheet. Following use, the capsule, containing spent coffee grounds presents a problem for environmentally friendly disposal and recycling. Recycling of metallic capsule bodies can be dangerous if the bodies are ruptured or torn leaving sharp edges.

The press is particularly suited for processing coffee capsules, although capsules from other beverages may be employed, and is described in the specification for convenience in relation to processing of spent coffee capsules.

SUMMARY OF THE INVENTION

According to the present invention, a beverage capsule recycling press comprises an annular body having an axis, an axial inlet, an axial outlet and a radially symmetrical annular sleeve communicating between the inlet and outlet,

- the body comprising first and second body portions connected by a hinge extending parallel to the axis of the sleeve;
- the second body portion being pivotable about the hinge relative to the first body portion between closed and open positions;
- a piston having a piston head, the piston being connected to the first body portion and moveable between a retracted position in which the piston is withdrawn from the inlet and an extended position in which the piston passes through the inlet and is located in the sleeve;
- a piston mounting for moving the piston between the retracted and extended positions;
- wherein first and second channels extend around the first and second body portions respectively adjacent the outlet of the sleeve.

In a preferred embodiment, at least a part of the first channel has an axial dimension smaller than an axial dimension of the second channel.

The first and second channels may extend circumferentially of the first and second body portions respectively.

In an embodiment the piston head may pass through the inlet, sleeve and outlet during movement from the retracted position to the extended position. In use of the press, the body may be opened and a spent capsule placed in the first body portion of the sleeve with the rim engaged in the first channel portion. The second body portion may then be pivoted to the closed position and the piston urged into the sleeve inlet and through the sleeve to the outlet. The piston may be urged into and through the sleeve by manual pressure applied to the moveable actuator. The smaller axial dimension of the first channel causes the rim of the capsule to more tightly engage in the first channel than the larger axial dimension of the second channel.

The movement of the piston head from the inlet through the sleeve to the outlet urges the capsule body downwardly towards the sleeve outlet so that the capsule body passes through the annular rim. The capsule body may be turned inside out through the rim, breaking the foil and ejecting the spent coffee grounds through the outlet into a container or collector. The body portions may then be opened. The smaller dimension of the first channel may cause the rim of the compressed capsule to remain engaged within the first channel when the body portions are opened. The capsule body may be retained in either the first or second body portion. This prevents the compressed capsule from falling from the press onto the discharged coffee grains, which may be received in a container, enabling the spent coffee grounds and capsule to be conveniently separated, particularly if a multiplicity of spent capsules are processed in succession. In an embodiment the capsule body is retained in the first body portion, preventing it from being retained in the second body portion as the second body portion moves to the opened position. This may prevent the spent coffee grounds from being spilled as the second body portion swings to the opened position.

The first and second channels may form a continuous channel extending around the circumference of the sleeve adjacent the outlet. Alternatively, the first channel may be intermittent so that the rim of the capsule is engaged within the first channel at a plurality of discrete locations.

The channels may have an axial or vertical dimension which decreases radially outwardly from the sleeve. In an embodiment, the channels may be V-shaped in cross section.

The first and second body portions may be dimensioned to divide the annular sleeve or surface into two equally sized portions, each occupying an angle of approximately 180° around the axis of the sleeve.

Alternatively, the first body portion may occupy a greater angle than the second portion, for example, from 180° to 220°, for example 180° to 200°, so that the rim of a capsule may be resiliently engaged upon insertion into the first channel in order to more securely support and retain the capsule in the first channel during use.

A latch may be provided to secure the body portions in the closed position. The latch may comprise a lift handle and block secured to an outer side wall of the first body portion, or to a handle of the press.

A spring or other resilient means may be used to bias the second body portion towards an opened position.

The piston may comprise a generally cylindrical piston body having a pivotal attachment at an upper end thereof and a piston head at a lower end thereof. The pivotal attachment may comprise a hinge arranged so that the piston hangs generally vertically from the pivot in use, for example from a pin of the piston mounting.

The piston head may be generally circular in plan view.

An annular projection may extend wholly or partially around the piston head at or adjacent the circumference of the piston head. The annular projection may form an axially concave rebate, in an embodiment having a radius of curvature selected to receive and engage the convex body of the capsule during pressing.

The projection may extend circumferentially of the piston head in a circular or O-shaped or C-shaped configuration.

Alternatively, in a preferred embodiment, the projection may be part circular, having a break in a circumferential region which is radially closest to the pivot of the handle. This arrangement allows the piston to be inserted into the inlet of the sleeve at an angle to the sleeve axis in a direction towards the pivot, without causing the head to be displaced out of axial alignment due to contact between the head and the convex surface of the capsule in use.

In an embodiment the press may comprise a moveable first handle connected to the piston mounting and a second fixed handle connected to the first fixed body portion. The piston is actuated by manually or otherwise urging the handles together.

The piston body may be generally cylindrical, the radial dimension of the sleeve increasing from the inlet to the outlet. The radial dimension of the inlet may be slightly greater than the diameter of the piston providing clearance for the piston body, reducing lateral movement of the piston in use. The radial dimension of the outlet may be greater than the diameter of the piston providing an annular volume between the piston and outlet into which the inverted capsule body may be received when the capsule is crushed and inverted by the piston.

The press tool may further comprise a receptacle for collection of coffee grounds released from the capsule. The receptacle may be located below the outlet of the body.

The tool may also comprise a foot or other support arranged to rest upon a work surface such as a table top, or kitchen unit, to support the tool in an upright orientation during storage and use.

In a second aspect of the present invention a method of processing beverage capsules comprises use of a press in accordance with the first aspect of this invention.

In use of the press, the body is opened and a spent coffee capsule placed into the sleeve with the foil covered rim facing downwardly, the rim being inserted into engagement with the first channel of the first body portion. This may secure the capsule while the second body portion is moved into the closed position and secured by closing the latch. Manual force may then be applied to the handles to urge the piston into the inlet of the sleeve, through the sleeve and out of the outlet of the sleeve. Alternatively, a motorised actuator may be provided. This movement causes the body of the capsule to rupture the foil, allowing discharge of the spent coffee grounds. The discharge of the grounds is completed by the piston head passing through the capsule rim. This may turn the capsule inside out to complete the discharge of the coffee grounds.

BRIEF DESCRIPTION OF THE DRAWINGS

The invention is further described by means of example but not in any limitative sense with reference to the drawings of which:—

DETAILED DESCRIPTION

Figure 1:
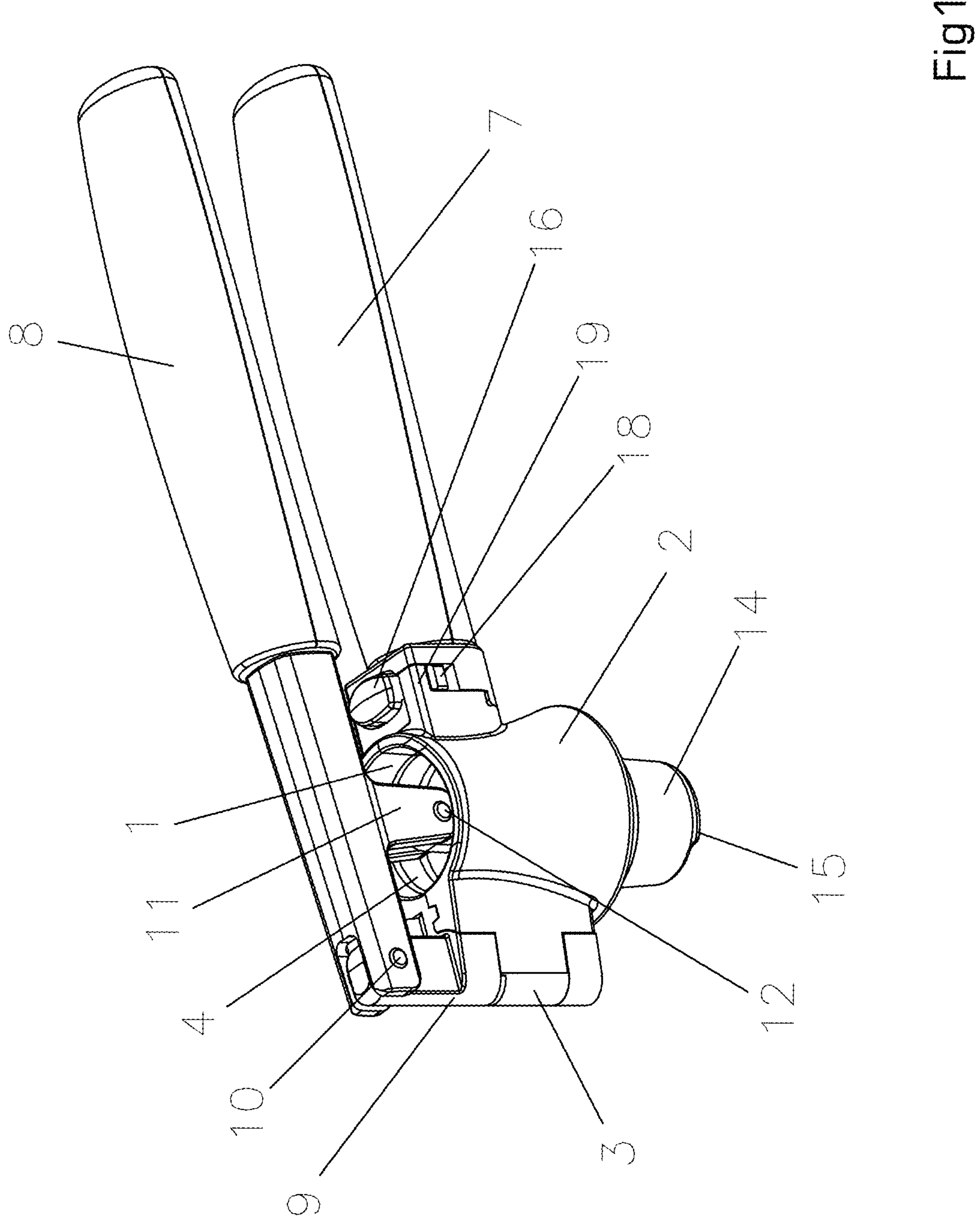
FIG. 1 is a perspective view of a press in accordance with this invention.
Figure 2:
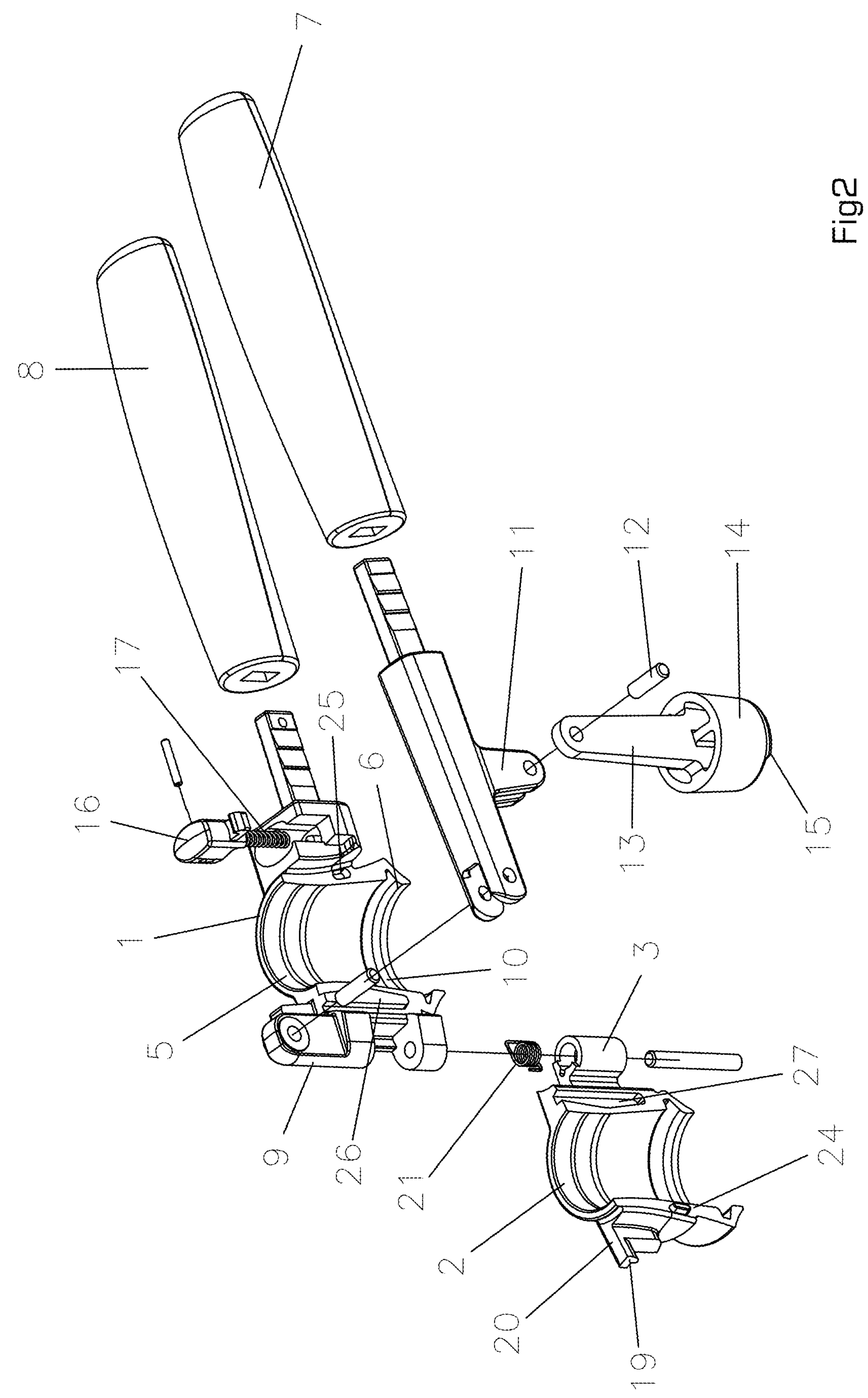
FIG. 2 is an exploded view of the press shown in FIG. 1.

The Figures show views of a coffee capsule press in accordance with this invention. The same reference numerals are used to refer to like components in each Figure.

The press comprises a body formed from a first body portion (1) and a second body portion (2) connected by a hinge (3) which allows the second body portion (2) to pivot between a closed position as shown in FIG. (1) and an opened position as shown in FIGS. (2) and (3).

The two body portions cooperate to form a sleeve (4). The sleeve (4) is axially symmetrical about a vertical axis and has an upper inlet (5) and a lower outlet (6). A handle (8) is fixed to the first body portion (1) and extends radially outwardly in a direction away from the location of the hinge (3). A moveable handle (7) is located above the fixed handle (8) and is pivotally secured to a mounting (9) by a horizontally extending pin (10). The vertical plane of movement of the handle (7) passes through the axis of the hinge (3).

A piston mounting (11) is pivotally secured by pin (12) to piston arm (13) which is integral with cylindrical piston body (14). Piston head (15) is formed at the lower end of the piston. When the moveable handle (7) is moved from an upper position to a lower position, the piston body is lowered into the inlet (5) of sleeve (4), passing through the sleeve and emerging from the outlet (6) as shown in FIG. 1.

In the lower position, the piston body (14) extends generally axially of the sleeve formed by the two body portions (1), (2).

A moveable latch (16) urged upwardly by spring (17) has an upwardly extending lug (18) which engages in a socket (19) of the catch plate (20) extending from the second body portion (2). The latch (16) prevents opening of the body portions during actuation of the piston. Depressing the latch (16) releases the lug from the catch plate allowing the second body portion (2) to pivot away from the first body portion towards the opened position. Spring (21) mounted internally in the hinge (3) biases the second body towards the opened position. A peg (24) extends from the edge of the second body and engages in a socket (25) in the edge of the first body portion to prevent relative movement of the body portions when forces are applied by the piston in the closed position. A further lug (26) extends from the first body portion at a location adjacent the hinge (3) and is received in a rebate (27) at a corresponding location in the second body portion in order to further prevent movement of the body portions in use.

Figure 3:
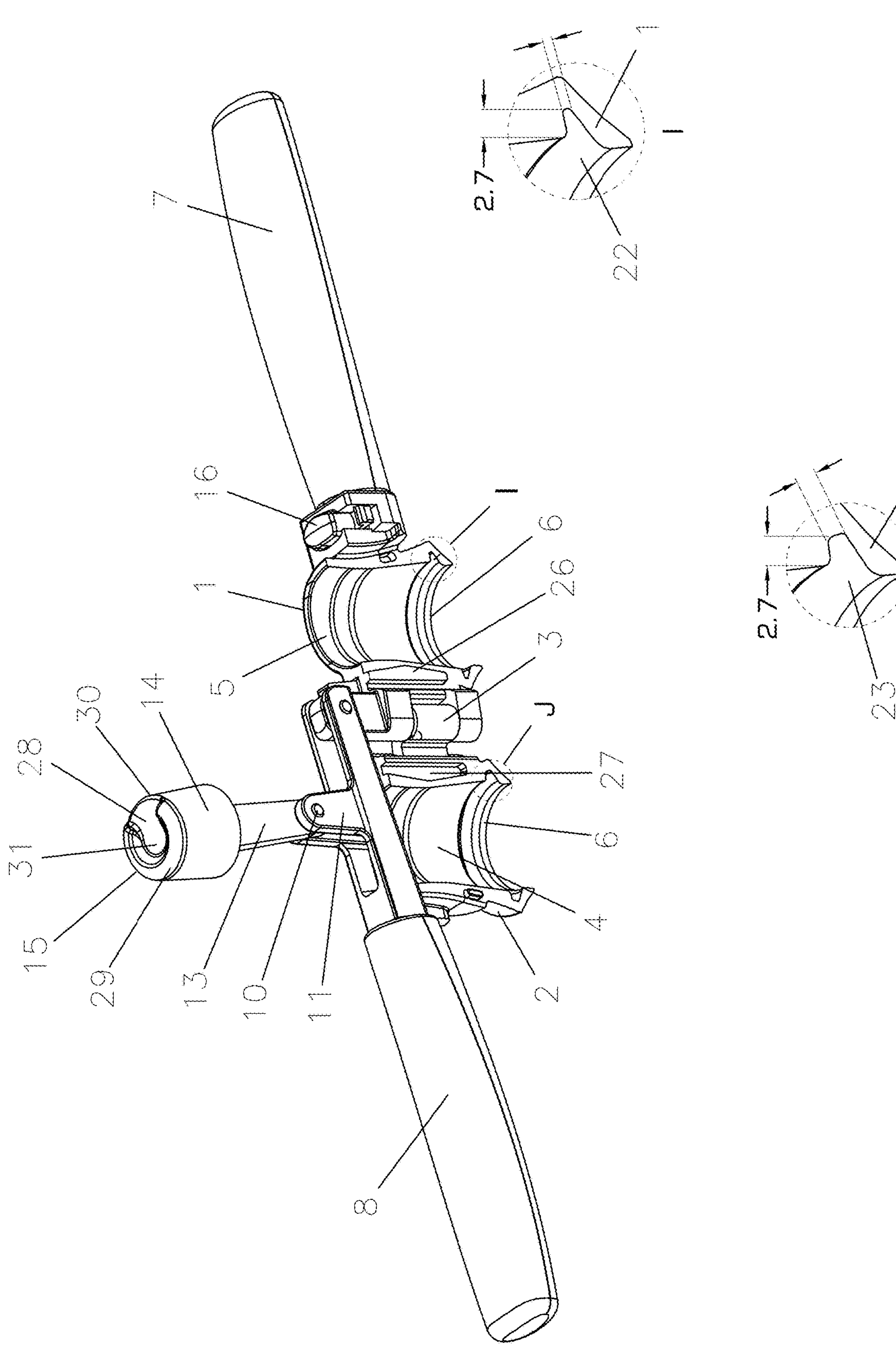
FIG. 3 is a perspective view of the press in the opened position.

An annular channel extends around the inner surface of the sleeve (4) adjacent the outlet (6). A first channel (22) extends around the inner surface of the first body portion (1) and a second channel (23) extends around the inner surface of the second body portion (2) as shown in FIG. 3. The first channel (22) may have a depth of 2.7 mm and a vertical width of 1 mm in the embodiment illustrated in FIG. 3(I). The second channel may have a depth of 2.7 mm and a vertical dimension of 2 mm as shown in FIG. 3(J). The smaller vertical height of the first channel provides tighter engagement with the rim of a capsule in use retaining the capsule in the first channel as the sleeve (4) is opened.

Figure 4:
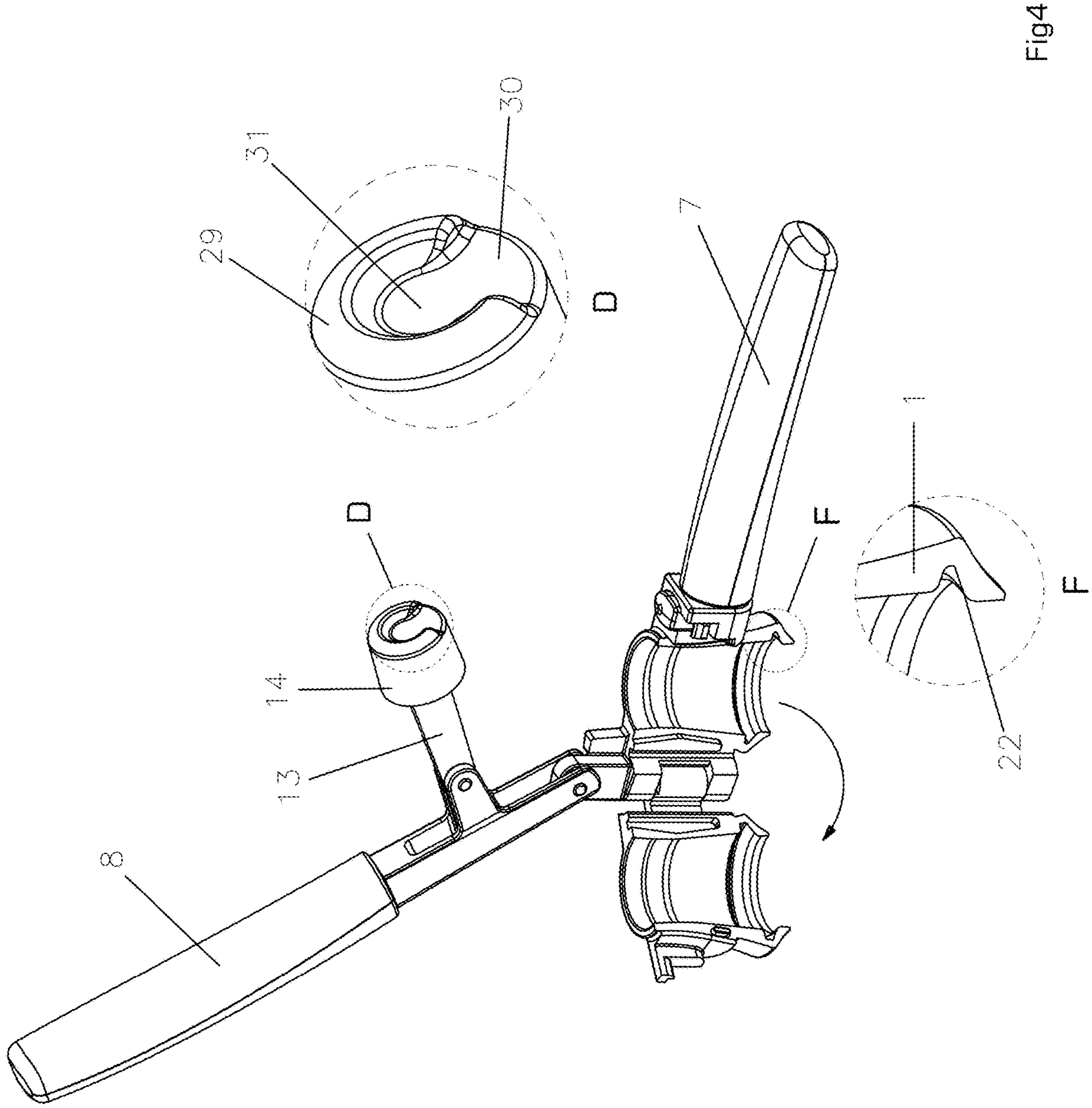
FIG. 4 is a perspective view showing the two body portions separated.
Figure 5:
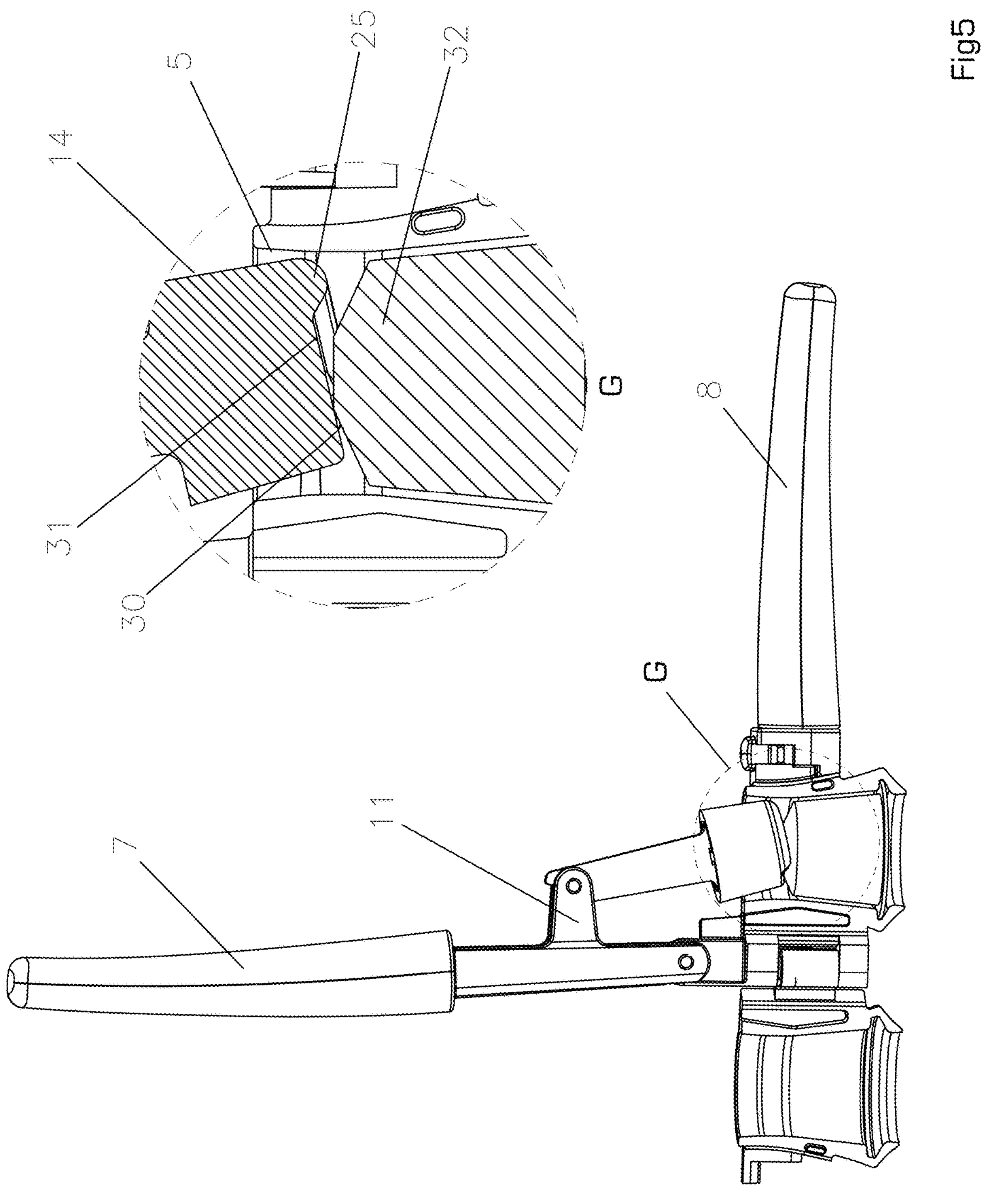
FIG. 5 shows further detail of the piston head in use.

The configuration of the piston and piston head is shown in FIGS. 3, 4 and 5. The piston body is generally cylindrical having a width selected so that it may pass into the inlet of the sleeve with minimal lateral movement.

The piston head (15) comprises a generally circular surface (28) with an annular or part annular projection (29) extending circumferentially around the piston head (15). The projection (29) is part annular as shown in the Figures, having an aperture (30) located at a side of the piston head facing the hinge (3) when the piston head is located within the sleeve (4) as the piston head is driven through the sleeve in use.

The centre of the piston head comprises a concave surface dimensioned to receive a convex capsule body (32) as shown in FIG. 5. When the piston is urged into the inlet (5) of the sleeve (4) as shown in FIG. 5, the piston mounting (11) and moveable handle (7) are located off-axis relative to the sleeve axis so that the piston is inserted into the inlet (5)

from one side. The convex or domed surface (32) of the uppermost part of the capsule body is received into the aperture (30) and passes into a recess of the concave portion (31) of the piston head as the piston is urged downwardly (as shown in the Figures) towards the outlet (6).

The application of a closing force between the handles (7, 8) urges the moveable handle towards a position in which it is parallel to the fixed handle, in which position the piston head extends through the sleeve and protrudes from the outlet as shown in FIG. 1. In this position, the capsule body has been deformed by the piston head so that it has ruptured the foil seal (not shown) and extends through the capsule rim, ejecting the spent coffee grounds from within the capsule. At this point, the latch (16) may be released allowing the second body portion to pivot under the force of spring (21) into the opened position. The rim of the compressed capsule is retained in the first channel (22) allowing a user to wait until all of the spent grounds have been discharged before releasing or allowing removal of the capsule body for recycling.

The invention claimed is:

1. A beverage capsule recycling press, comprising:

an annular body having an axis, an axial inlet, an axial outlet and a radially symmetrical annular sleeve communicating between the inlet and outlet, the annual body comprising first and second body portions connected by a hinge extending parallel to the axis, the second body portion being pivotable about the hinge relative to the first body portion between closed and open positions;

a piston having a piston head, the piston being connected to the first body portion and moveable between a retracted position in which the piston is withdrawn from the inlet and an extended position in which the piston passes through the inlet and is located in the sleeve; and a piston mounting for moving the piston between the retracted and extended positions;

wherein first and second channels extend circumferentially of the first and second body portions respectively adjacent the outlet of the sleeve.

2. The beverage capsule recycling press as claimed in claim 1, wherein at least a part of the first channel has an axial dimension smaller than an axial dimension of the second channel.

3. The beverage capsule recycling press as claimed in claim 1, wherein the piston head passes through the inlet, sleeve and outlet during movement from the retracted position to the extended position.

4. The beverage capsule recycling press as claimed in claim 1, wherein a radial dimension of the outlet is greater than a radial dimension of the inlet.

5. The beverage capsule recycling press as claimed in claim 1, wherein the first and second channels form a continuous channel extending around a circumference of the sleeve adjacent the outlet.

6. The beverage capsule recycling press as claimed in claim 1, wherein the first and second channels have a vertical dimension which decreases radially outwardly from the sleeve.

7. The beverage capsule recycling press as claimed in claim 6, wherein the channels are V-shaped in cross-section.

8. The beverage capsule recycling press as claimed in claim 1, wherein the first and second body portions divide the annular surface into two equally sized portions.

9. The beverage capsule recycling press as claimed in claim 1, wherein the first body portion occupies a greater angle than the second body portion.

10. The beverage capsule recycling press as claimed in claim 1, further comprising:

a latch configured to secure the body portions in the closed position.

11. The beverage capsule recycling press as claimed in claim 10, further comprising:

a spring configured to bias the second body portion towards the open position.

12. The beverage capsule recycling press as claimed in claim 1, wherein the piston comprises a cylindrical piston body having a pivotal attachment at an upper end thereof, and the piston head at a lower end thereof.

13. The beverage capsule recycling press as claimed in claim 12, wherein the pivotal attachment comprises a hinge arranged so that the piston hangs generally vertically from the hinge in use.

14. The beverage capsule recycling press as claimed in claim 1, wherein an annular projection extends partially around the piston head at or adjacent the circumference of the piston head.

15. The beverage capsule recycling press as claimed in claim 1, wherein an annular projection forms an axially concave rebate.

16. The beverage capsule recycling press as claimed in claim 1, wherein the projection is part circular having a break in a circumferential region.

17. The beverage capsule recycling press as claimed in claim 1, further comprising:

a first moveable handle connected to a piston actuator and a second fixed handle connected to the body portion where the body portion is fixed.

18. The beverage capsule recycling press as claimed in claim 1, further comprising:

a container located to receive spent grounds from the outlet.

* * * * *